(12) United States Patent
Zhou et al.

(10) Patent No.: US 11,996,009 B1
(45) Date of Patent: May 28, 2024

(54) METHOD AND DEVICE FOR IMPACT TEST ON LOWER ABDOMEN OF VEHICLE CRASH TEST DUMMY

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Hua Zhou, Tianjin (CN); Zhixin Liu, Tianjin (CN); Weidong Liu, Tianjin (CN); Yuechen Ji, Tianjin (CN); Kai Wang, Tianjin (CN); Hong Chen, Tianjin (CN); Hai Liu, Tianjin (CN); Bingxu Duan, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/474,260

(22) Filed: Sep. 26, 2023

(30) Foreign Application Priority Data

Nov. 28, 2022 (CN) .......................... 202211496024.1

(51) Int. Cl.
*G01M 7/08* (2006.01)
*G09B 23/32* (2006.01)

(52) U.S. Cl.
CPC ............... *G09B 23/32* (2013.01); *G01M 7/08* (2013.01)

(58) Field of Classification Search
CPC .................................. G01M 7/08; G09B 23/32
See application file for complete search history.

(56) References Cited

U.S. PATENT DOCUMENTS

| 10,229,616 B2 | 3/2019 | Khambati et al. |
| 10,943,510 B2 | 3/2021 | Khambati et al. |
| (Continued) | | |

FOREIGN PATENT DOCUMENTS

| CN | 102661841 A | * | 9/2012 |
| CN | 102878965 A | * | 1/2013 |
| (Continued) | | | |

OTHER PUBLICATIONS

Zhang Shizhe, Chinese Master's Theses Full-text Database Engineering Science and Technology, Optimization of Vehicle Restraint Based on Finite Element Model of Driver's Chest in Frontal Impact, 2022, pp. 32-33, Issue 1, China.

*Primary Examiner* — Natalie Huls
(74) *Attorney, Agent, or Firm* — True Shepherd LLC; Andrew C. Cheng

(57) ABSTRACT

A method for impact test on a lower abdomen of a vehicle crash test dummy includes: controlling an arc-shaped hammer head to impact a lower abdomen of a preset dummy at a preset speed; obtaining displacements from a displacement sensor, wherein the displacements are generated by the lower abdomen of the preset dummy and the arc-shaped hammer head during the impact; obtaining a pressure from a pressure sensor, wherein the pressure is borne by the lower abdomen of the preset dummy during the impact; and determining, based on the displacements and the pressure, whether the preset dummy satisfies a biological simulation standard. The method is capable of testing whether the current dummy satisfies the biological simulation standard, so as to ensure the accuracy of test data in subsequent vehicle crash tests using the dummy.

9 Claims, 12 Drawing Sheets

(56) References Cited

U.S. PATENT DOCUMENTS

| 11,244,088 | B2 | | 2/2022 | Shah | |
|---|---|---|---|---|---|
| 2018/0136077 | A1 | * | 5/2018 | Pfeifer | ........................ F23D 3/08 |
| 2018/0211567 | A1 | * | 7/2018 | Pfeifer | ..................... G01D 5/165 |

FOREIGN PATENT DOCUMENTS

| CN | 106546139 | A | * | 3/2017 | | |
|---|---|---|---|---|---|---|
| CN | 206399662 | U | * | 8/2017 | | |
| CN | 109211592 | A | * | 1/2019 | ......... | G01M 17/0078 |
| EP | 3281188 | B1 | * | 8/2020 | ........... | G01L 5/0052 |

* cited by examiner

METHOD AND DEVICE FOR IMPACT TEST ON LOWER ABDOMEN OF VEHICLE CRASH TEST DUMMY

CROSS-REFERENCE TO RELATED APPLICATIONS

This application claims priority to Chinese Patent Application No. 202211496024.1 with a filing date of Nov. 28, 2022. The content of the aforementioned application, including any intervening amendments thereto, is incorporated herein by reference.

TECHNICAL FIELD

The present disclosure relates to the field of data processing, in particular to a method and device for impact test on a lower abdomen of a vehicle crash test dummy.

DESCRIPTION OF RELATED ART

With the increase in vehicle holdings and frequent occurrence of traffic accidents, the importance of vehicle safety is gradually increasing. A passive safety testing technology for vehicles is of great significance for passenger protection. A crash dummy is indispensable in a crash test of vehicle passive safety. Damage of a crash to the human body is researched through data provided by a dummy sensor after the crash test, so as to propose optimization and improvement and increase the safety of vehicles.

To ensure the accuracy of vehicle crash test data, the crash dummy needs to be calibrated before testing. The consistency of bio-mechanical responses between the dummy and a real person is verified through calibration. Current calibration tests only focus on the head, neck, chest, and knees, but seldom research the abdomen.

In view of this, the present disclosure is proposed.

SUMMARY OF PRESENT INVENTION

In order to solve the foregoing technical problems, the present disclosure provides a method and device for impact test on a lower abdomen of a vehicle crash test dummy, which is capable of testing whether the current dummy satisfies a biological simulation standard, so as to ensure the accuracy of test data in subsequent vehicle crash tests using the dummy.

An embodiment of the present disclosure provides a method for impact test on a lower abdomen of a vehicle crash test dummy. The method is performed by a device for impact test on a lower abdomen of a vehicle crash test dummy, the device includes an arc-shaped hammer head, a fixed preset dummy, a displacement sensor, and a pressure sensor. The method includes:
  controlling the arc-shaped hammer head to impact the lower abdomen of the preset dummy at a preset speed;
  obtaining the displacements from the displacement sensor, where the displacements are generated by the lower abdomen of the preset dummy and the arc-shaped hammer head during the impact;
  obtaining the pressure from the pressure sensor, where the pressure is borne by the lower abdomen of the preset dummy during the impact; and
  determining, based on the displacements and the pressure, whether the preset dummy satisfies the biological simulation standard.

An embodiment of the present disclosure provides a device for impact test on a lower abdomen of a vehicle crash test dummy. The device is used for implementing the foregoing method for impact test on a lower abdomen of a vehicle crash test dummy, and includes a fixing platform, a dummy fixing apparatus, an impact hammer, a control apparatus connected to the impact hammer, and a preset dummy. The dummy fixing apparatus is provided with a pressure sensor. The pressure sensor is connected to a pelvic tail of the preset dummy and the control apparatus respectively. The impact hammer comprises an arc-shaped hammer head and a displacement sensor. The displacement sensor is connected to the arc-shaped hammer head and the control apparatus respectively.

The fixing platform is used for fixing the dummy fixing apparatus.

The dummy fixing apparatus is used for fixing the preset dummy.

The impact hammer is used for driving the arc-shaped hammer head to impact the lower abdomen of the preset dummy.

The control apparatus is used for controlling the impact hammer to impact the lower abdomen of the preset dummy.

The pressure sensor is used for collecting the pressure borne by the lower abdomen of the preset dummy when the arc-shaped hammer head impacts the lower abdomen of the preset dummy.

The displacement sensor is used for collecting the displacements generated by the lower abdomen of the preset dummy and the arc-shaped hammer head when the arc-shaped hammer head impacts the lower abdomen of the preset dummy.

The control apparatus is further used for determining, based on the displacements and the pressure, whether the preset dummy satisfies the biological simulation standard.

The embodiments of the present disclosure have the following technical effects:
  the arc-shaped hammer head impacts the lower abdomen of the preset dummy at the preset speed, so as to simulate a scenario where a driver brakes suddenly during high-speed driving, a human body inclines forward due to inertia, and a safety belt impacts the lower abdomen of the human body; the displacement sensor and the pressure sensor detect the displacements of the lower abdomen of the dummy and the arc-shaped hammer head and the pressure borne by the lower abdomen of the dummy when the arc-shaped hammer head impacts the lower abdomen of the dummy; whether mechanical responses of the dummy satisfy the biological simulation standard is determined by using the displacements and the pressure; and therefore, the shortcoming that existing dummy calibration tests focus on only a head, a neck, a chest, knees and other parts but not on the lower abdomen is overcome, and the lower abdomen impact test is capable of testing whether the current dummy satisfies the biological simulation standard so as to ensure the accuracy of test data in subsequent vehicle crash tests using the dummy.

BRIEF DESCRIPTION OF THE DRAWINGS

In order to describe technical solutions in specific implementations of the present disclosure or in the prior art more clearly, the accompanying drawings required in the description of the specific implementations or the prior art will be briefly introduced below. Apparently, the accompanying drawings in the following description show only some

In the figures: 1—fixing platform; 2—dummy fixing apparatus; 3—impact hammer; 4—first compression bolt; 5—support rib plate; 6—second compression bolt; 7—pressure sensor; 8—first adjusting bolt; 9—third slider; 10—third slide rail; 11—first slide rail; 12—trunk support plate; 13—first slider; 14—second slide rail; 15—second slider; 16—second adjusting bolt; 17—cover plate; 18—chest connecting plate; 19—third compression bolt; 20—adjusting hole; 21—back support plate; 22—third adjusting bolt; 23—fourth compression bolt; 24—pelvic tail connecting plate; 25—trunk support bottom plate; 26—second-stage double-layer gear; 27—fourth slider; 28 three-stage double-layer gear; 29—second-stage single-layer gear; 30—first-stage single-layer gear; 31—crank; 32—hand grip; 33—arc-shaped hammer head; 34—displacement sensor; 35—pulley; 36—hammer body; 37—impact hammer counterweight; 38—acceleration sensor; 39—control apparatus; 40—chest connecting portion; 41—back support portion; 42—pelvic tail connecting portion; 43—preset dummy; 44—limit slider; 44a—elongated hole; 45—clamping groove; 46—limit tooth; 47—limit gear; 48—limit clamping groove; 49—metal sheet; 50—gasket.

DESCRIPTION OF THE EMBODIMENTS

In order to make objectives, technical solutions and advantages of the present disclosure clearer, technical solutions of the present disclosure will be described clearly and completely below. Obviously, the described embodiments are only some rather than all embodiments of the present disclosure. Based on the embodiments of the present disclosure, all other embodiments obtained by those of ordinary skill in the art without any creative effort fall within the protection scope of the present disclosure.

Figure 1:
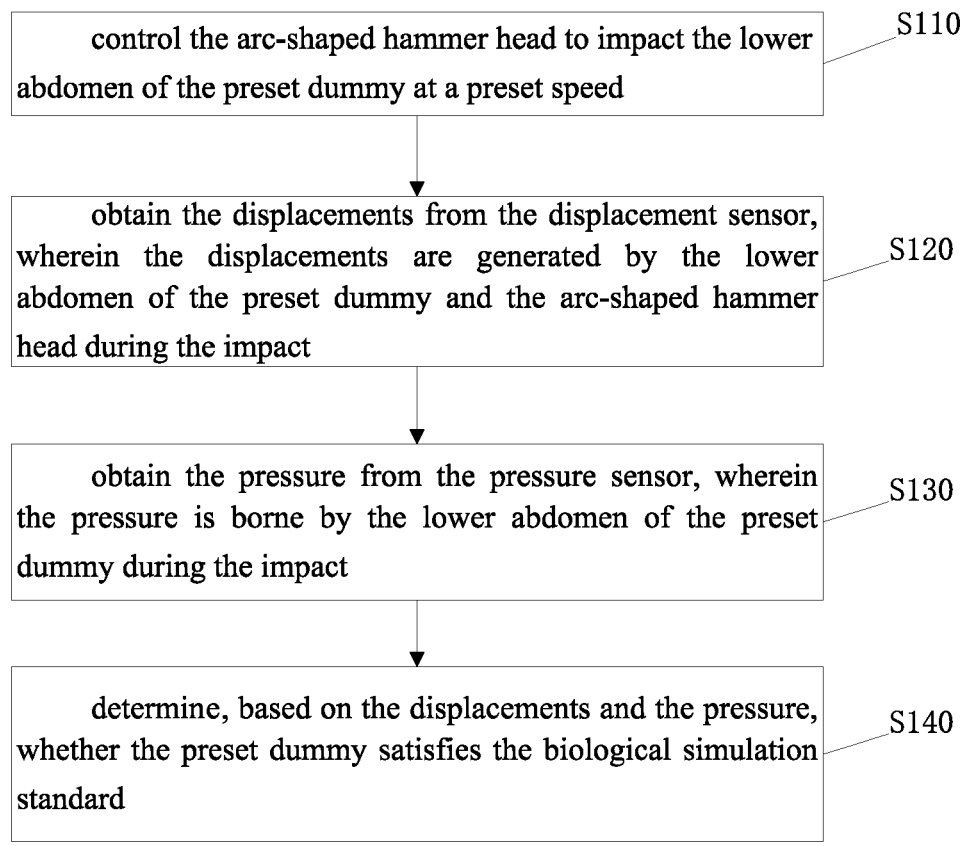
FIG. 1 is a schematic flowchart of a method for impact test on a lower abdomen of a vehicle crash test dummy according to an embodiment of the present disclosure.

FIG. 1 is a schematic flowchart of a method for impact test on a lower abdomen of a vehicle crash test dummy according to an embodiment of the present disclosure. The method is performed by a device for impact test on a lower abdomen of a vehicle crash test dummy. The device for impact test on a lower abdomen of a vehicle crash test dummy includes an arc-shaped hammer head, a fixed preset dummy, a displacement sensor, and a pressure sensor. With reference to FIG. 1, the method for impact test on a lower abdomen of a vehicle crash test dummy specifically includes:

S110: the arc-shaped hammer head is controlled to impact a lower abdomen of the preset dummy at a preset speed.

S120: the displacements are obtained from the displacement sensor, where the displacements are generated by the lower abdomen of the preset dummy and the arc-shaped hammer head during the impact.

S130: the pressure is obtained from the pressure sensor, where the pressure is borne by the lower abdomen of the preset dummy during the impact.

S140: based on the displacements and the pressure, whether the preset dummy satisfies the biological simulation standard is determined.

A lower abdomen impact test on a dummy in the embodiment simulates impact of a safety belt on the lower abdomen of a human body in an emergency braking process. Therefore, a hammer head used for impacting the lower abdomen is the arc-shaped hammer head. Preferably, in the embodiment, the arc-shaped hammer head may be driven to impact the lower abdomen of the preset dummy by controlling movement of a mechanical structure connected to the arc-shaped hammer head. The preset speed of the arc-shaped hammer head may be any speed within a range of 2±0.1 m/s, 3±0.1 m/s, or 3±0.1 m/s, which is not specifically limited herein. In order to ensure the accuracy of test results, the arc-shaped hammer head may preferably be controlled to impact the lower abdomen of the preset dummy at a plurality of preset speeds so as to obtain a plurality of test results. For example, the plurality of preset speeds may include 2 m/s, 3 m/s, and 4 m/s. It should be noted that, the arc-shaped hammer head is on the same horizontal plane as the lower abdomen of the preset dummy and moves towards the lower abdomen of the preset dummy on the horizontal plane during the impact, without moving in any other direction (such as a vertical direction).

The displacement sensor used in the device for impact test on a lower abdomen of a vehicle crash test dummy is used for measuring the displacements of the lower abdomen of the preset dummy (or the displacements of the arc-shaped hammer head) during the impact. The displacements in the embodiment may be displacements of one or more positions of an impacted portion of the lower abdomen of the preset dummy, and may be obtained through the displacement sensor. The displacement sensor may be connected to the arc-shaped hammer head so as to sense the displacements of the arc-shaped hammer head or the lower abdomen of the preset dummy, and may preferably be arranged on the arc-shaped hammer head. One or more displacement sensors may be configured, which is not limited herein. For example, when one displacement sensor is configured and the displacement at a plurality of positions on the lower abdomen of the preset dummy needs to be measured, a metal sheet may preferably be arranged at each of corresponding positions on the arc-shaped hammer head, and the metal sheets are connected to the displacement sensor. When the arc-shaped hammer head impacts the lower abdomen of the preset dummy, the displacement sensor can measure the displacements at the plurality of positions.

The pressure sensor used in the device for impact test on a lower abdomen of a vehicle crash test dummy is used for measuring the pressure borne by the lower abdomen of the preset dummy under the impact of the arc-shaped hammer head (or impact force of the arc-shaped hammer head). The pressure sensor may preferably be connected to a pelvic tail of the preset dummy.

A method for determining whether the preset dummy satisfies the biological simulation standard may preferably include the following steps that the displacements and the pressure are compared with standard displacements and standard pressure, respectively, and according to comparison results, whether the preset dummy satisfies the biological simulation standard is determined. Preferably, when a difference between the displacements and the standard displacements is small and a difference between the pressure and the standard pressure is small, it may be determined that the preset dummy satisfies the biological simulation standard. Otherwise, it may be determined that the preset dummy does not satisfy the biological simulation standard. For example, if the difference between the displacements and the standard displacements is large, it may be determined that the preset dummy does not satisfy the biological simulation standard. If the difference between the displacements and the standard displacements is small and within a preset range, it may be determined that a displacement-related mechanical response of the preset dummy satisfies the biological simulation standard. If the difference between the pressure and the standard pressure is large, it may be determined that the preset dummy does not satisfy the biological simulation standard. If the difference between the pressure and the standard pressure is small and within a preset range, it may be determined that a pressure-related mechanical response of the preset dummy satisfies the biological simulation standard. It may be understood that, in addition to the displacements and the pressure, other mechanical information may also be obtained in the technical solution of the embodiment, and further whether the preset dummy satisfies the biological simulation standard is accurately determined. The other mechanical information may be acceleration, etc.

Preferably, the step that based on the displacements and the pressure, whether the preset dummy satisfies the biological simulation standard is determined includes the following steps:

a displacement-time test curve is determined based on the displacements;

a pressure-time test curve is determined based on the pressure;

based on a corridor method, a first similarity between the displacement-time test curve and a displacement-time standard curve is determined, where the displacement-time standard curve is obtained from a lower abdomen impact test on a standard dummy;

based on the corridor method, a second similarity between the pressure-time test curve and a pressure-time standard curve is determined, where the pressure-time standard curve is obtained from the lower abdomen impact test on the standard dummy; and based on the first similarity and the second similarity, whether the preset dummy satisfies the biological simulation standard is determined.

In the embodiment, when both the first similarity and the second similarity are greater than preset similarity thresholds, it may be determined that the preset dummy satisfies the biological simulation standard, and otherwise the preset dummy does not satisfy the biological simulation standard.

For example, the displacement-time standard curve and the pressure-time standard curve may be obtained by performing 10 lower abdomen impact tests on 10 groups of Hybrid III 50th standard dummies (the standard dummies satisfy the biological simulation standard) so as to obtain 10 standard dummy displacement-time curves and 10 standard dummy pressure-time curves, and computing an average value of the 10 standard dummy displacement-time curves and an average value of the 10 standard dummy pressure-time curves respectively.

The corridor method in the embodiment is shown as follows:

an inner corridor lower curve $\delta_{i\_lower}(t)$, an inner corridor upper curve $\delta_{i\_upper}(t)$, an outer corridor lower curve $\delta_{o\_lower}(t)$, and an outer corridor upper curve $\delta_{o\_upper}(t)$ are computed based on a standard curve x(t), respectively, and specific formulas are as follows:

$$\delta_{i\_lower}(t)=x(t)-\delta_i(t)$$

$$\delta_{o\_upper}(t)=x(t)+\delta_i(t)$$

$$\delta_{i\_lower}(t)=x(t)-\delta_o(t)$$

$$\delta_{o\_upper}(t)=x(t)+\delta_o(t)$$

where $\delta_i(t)$ is half of a width of an inner corridor, $\delta_o(t)$ is half of a width of an outer corridor, $\delta_i(t)<\delta_o(t)$, and specific formulas are as follows:

$$\delta_i(t)=a_0 \cdot Y + a_s \cdot \sigma(t)$$

$$\delta_o(t)=b_0 \cdot Y + b_s \cdot \sigma(t)$$

where $a_0$ is a parameter that defines a relative half width of the inner corridor, $b_0$ is a parameter that defines a relative half width of the outer corridor, $0 \leq a_0 \leq 1$, $0 \leq b_0 \leq 1$, $a_0 < b_0$, Y=max(x(t)), $a_s$ and $b_s$ are scaling parameters, $\sigma(t)$ is a standard deviation, and a computational formula is as follows:

$$\sigma(t) = \sqrt{\frac{\sum_{f=1}^{n_{Test}}(x_f(t)-x(t))^2}{n_{Test}}}$$

where $x_f(t)$ is a corresponding curve obtained from the $f_{th}$ lower abdomen impact test using standard dummy, where f=1, 2 ... $n_{Test}$, and $n_{Test}$ is an integer.

During actual use of the corridor method, a test curve may completely fall within a range of corridor curves by adjusting values of $a_0$, $b_0$, $a_s$, and $b_s$, so as to compute a similarity between the test curve and a corresponding standard curve. Before the similarity is computed, a time interval ($t_{min}$, $t_{max}$) may be divided into p portions, and a similarity $c_m$ within each time step $t_m$ may be computed. The similarity $c_1$ between the test curve and the corresponding standard curve is an average value of the similarities $c_m$ within p time steps.

Computational formulas for $c_m$ and $c_1$ are as follows:

$$C_m = \begin{cases} 1 & |y(t_m) - x(t_m)| < \delta_i(t) \\ \left(\dfrac{\delta_o(t) - |y(t_m) - x(t_m)|}{\delta_o(t) - \delta_i(t)}\right)^k & k \in N_{>0} \\ 0 & |y(t_m) - x(t_m)| > \delta_i(t) \end{cases}$$

$$C_1 = \dfrac{\sum_{m=1}^{p} c_m}{p} \quad 0 \le C_1 \le 1$$

where $y(t_m)$ is a test curve corresponding to each time step $t_m$, and m=1, 2, 3 ... p. The exponent k describes a grade decrease of $c_m$ from 1 to 0, and the larger k, the larger attenuation in the grade of a curve with respect to the distance between the curve and the inner corridor.

The closer the value of $c_1$ is to 1, the more similar the test curve is to the standard curve, and the more the preset dummy satisfies the corresponding biological simulation standard. On the contrary, the closer the value of $c_1$ is to 0, the less similar the test curve is to the standard curve, and the less the preset dummy satisfies the corresponding biological simulation standard. In a specific implementation process, a preset similarity threshold may be set. When the value of $c_1$ is greater than the preset similarity threshold, the preset dummy satisfies the corresponding biological simulation standard. Otherwise, the preset dummy does not satisfy the corresponding biological simulation standard.

The embodiment has the following technical effects: the arc-shaped hammer head impacts the lower abdomen of the preset dummy at a preset speed so as to simulate a scenario where a driver brakes suddenly during high-speed driving, the human body inclines forward due to inertia, and a safety belt impacts the lower abdomen of the human body; the displacement sensor and the pressure sensor detect the displacements of the lower abdomen of the dummy and the arc-shaped hammer head and pressure borne by the lower abdomen of the dummy when the arc-shaped hammer head impacts the lower abdomen of the dummy; whether mechanical responses of the dummy satisfy the biological simulation standard is determined by using the displacements and the pressure; and therefore, the shortcoming that existing dummy calibration tests focus on only a head, a neck, a chest, knees and other parts but not on the lower abdomen is overcome, and the lower abdomen impact test is capable of testing whether the current dummy satisfies the biological simulation standard so as to ensure the accuracy of test data in subsequent vehicle crash tests using the dummy.

Based on the foregoing embodiments, the device for impact test on a lower abdomen of a vehicle crash test dummy further includes an acceleration sensor used for feeding back a real-time acceleration of the arc-shaped hammer head. The lower abdomen impact test further includes the following step:

a pendulum force of the arc-shaped hammer head is adjusted according to the real-time acceleration fed back by the acceleration sensor.

Preferably, an acceleration-time test curve may be determined based on the real-time acceleration, and a third similarity between the acceleration-time test curve and an acceleration-time standard curve is determined based on a corridor method; and whether the preset dummy satisfies the biological simulation standard is determined based on the first similarity, the second similarity, and the third similarity. It may be understood that, when the first similarity, the second similarity and the third similarity are all greater than preset similarity thresholds, it may be determined that the preset dummy satisfies the biological simulation standard, and otherwise, the preset dummy does not satisfy the biological simulation standard.

Based on the foregoing embodiments, the displacements further include a displacement corresponding to a preset position. The preset position is a central position of each portion after a contact surface between the arc-shaped hammer head and the lower abdomen is evenly divided into at least two portions.

In a vehicle crash accident, relevant tissues of the human abdomen will generate responses such as acceleration and displacements (abdominal compression) under the action of the safety belt. When these responses exceed maximum limits borne by the human tissues, human organs will be ruptured or injured. An injury may be determined and predicted by measuring local compression, so displacements of a plurality of points (i.e., preset positions) on the contact surface may be measured.

For example, the contact surface between the arc-shaped hammer head and the lower abdomen of the preset dummy may be evenly divided into three portions so as to determine the central position of each portion, and displacements at the central position of each portion are measured by using the displacement sensor. Specifically, a metal sheet may be added at each preset position of the contact surface and connected to the displacement sensor. When the metal sheets are in contact with skin, the displacement sensor begins to measure displacements, where the maximum displacement is the amount of invasion into the lower abdomen. The displacement measurement method starts at contact and ends after the crash.

Figure 2:
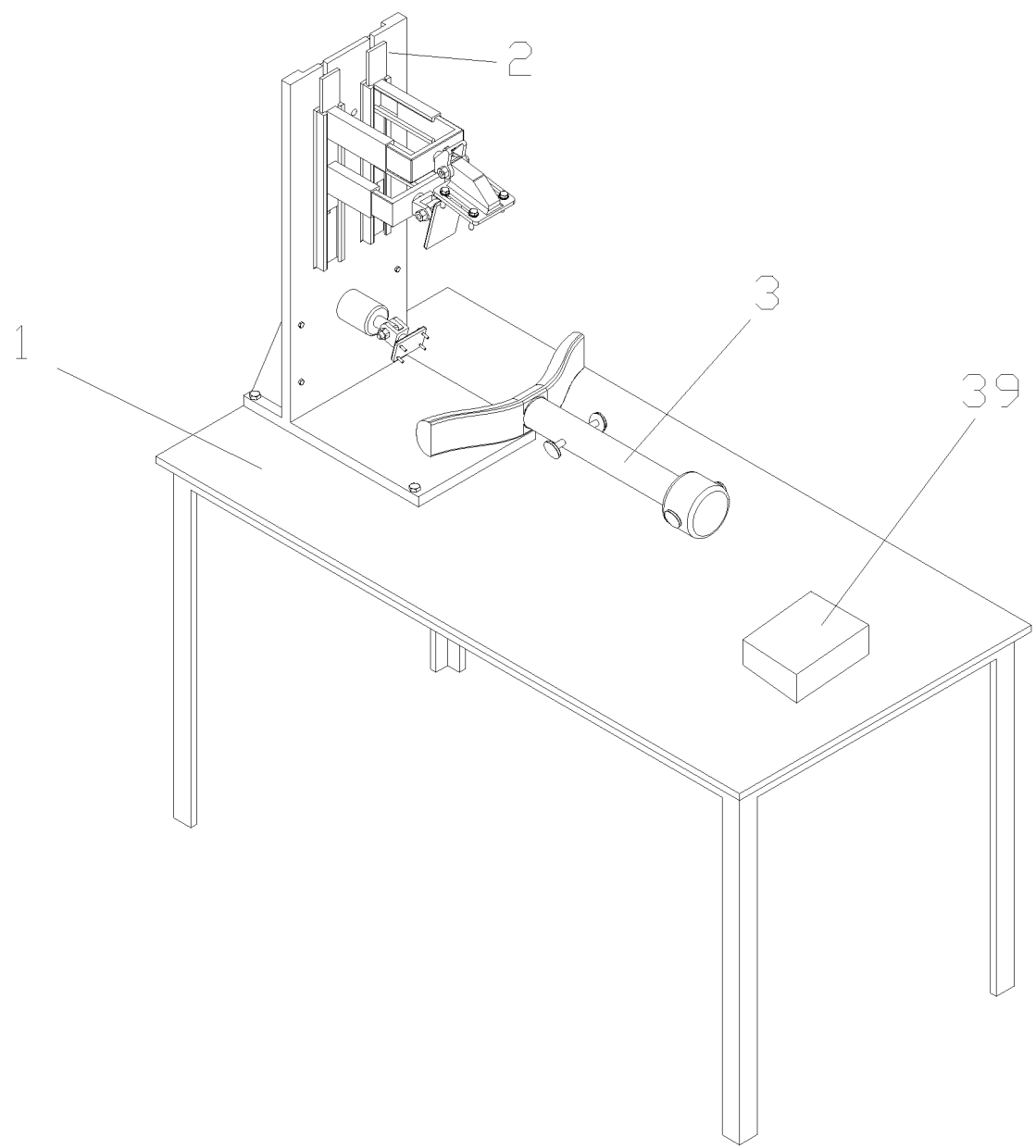
FIG. 2 is a schematic structural diagram of a device for impact test on a lower abdomen of a vehicle crash test dummy according to an embodiment of the present disclosure.
Figure 3:
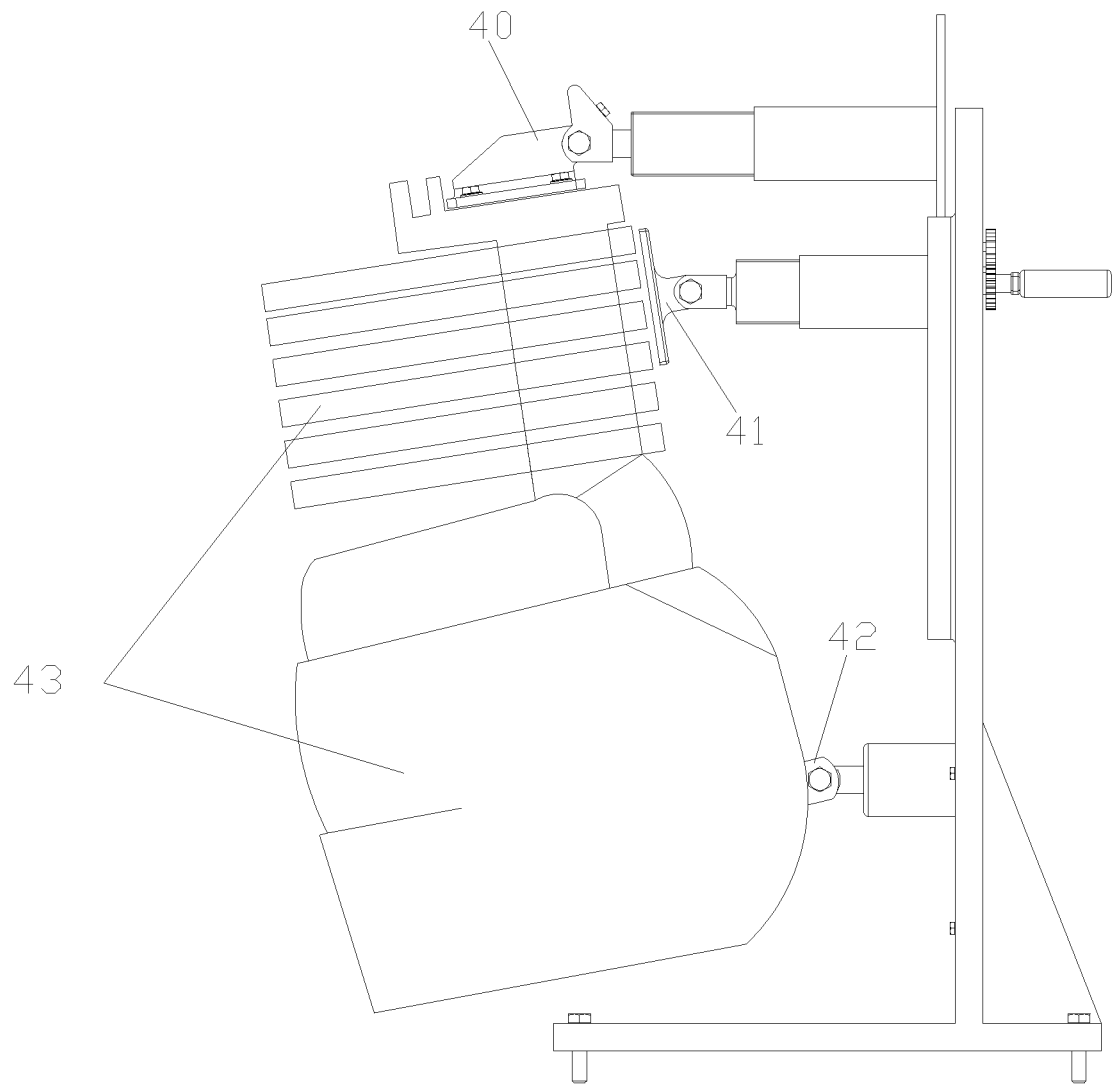
FIG. 3 is a schematic diagram of cooperation between a dummy fixing apparatus for a vehicle crash test and a preset dummy according to an embodiment of the present disclosure.
Figure 4:
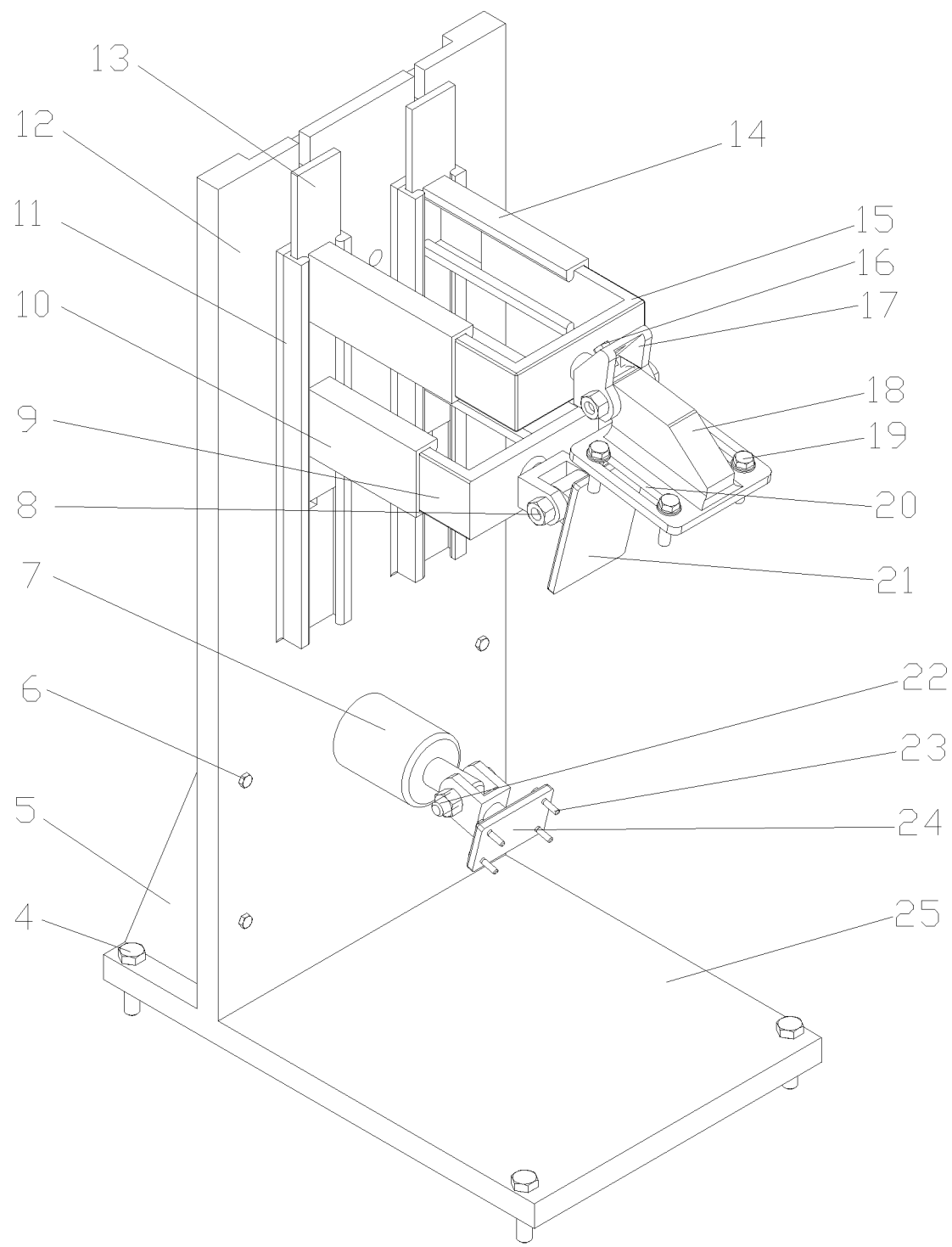
FIG. 4 is a schematic structural diagram of a dummy fixing apparatus for a vehicle crash test according to an embodiment of the present disclosure.
Figure 5:
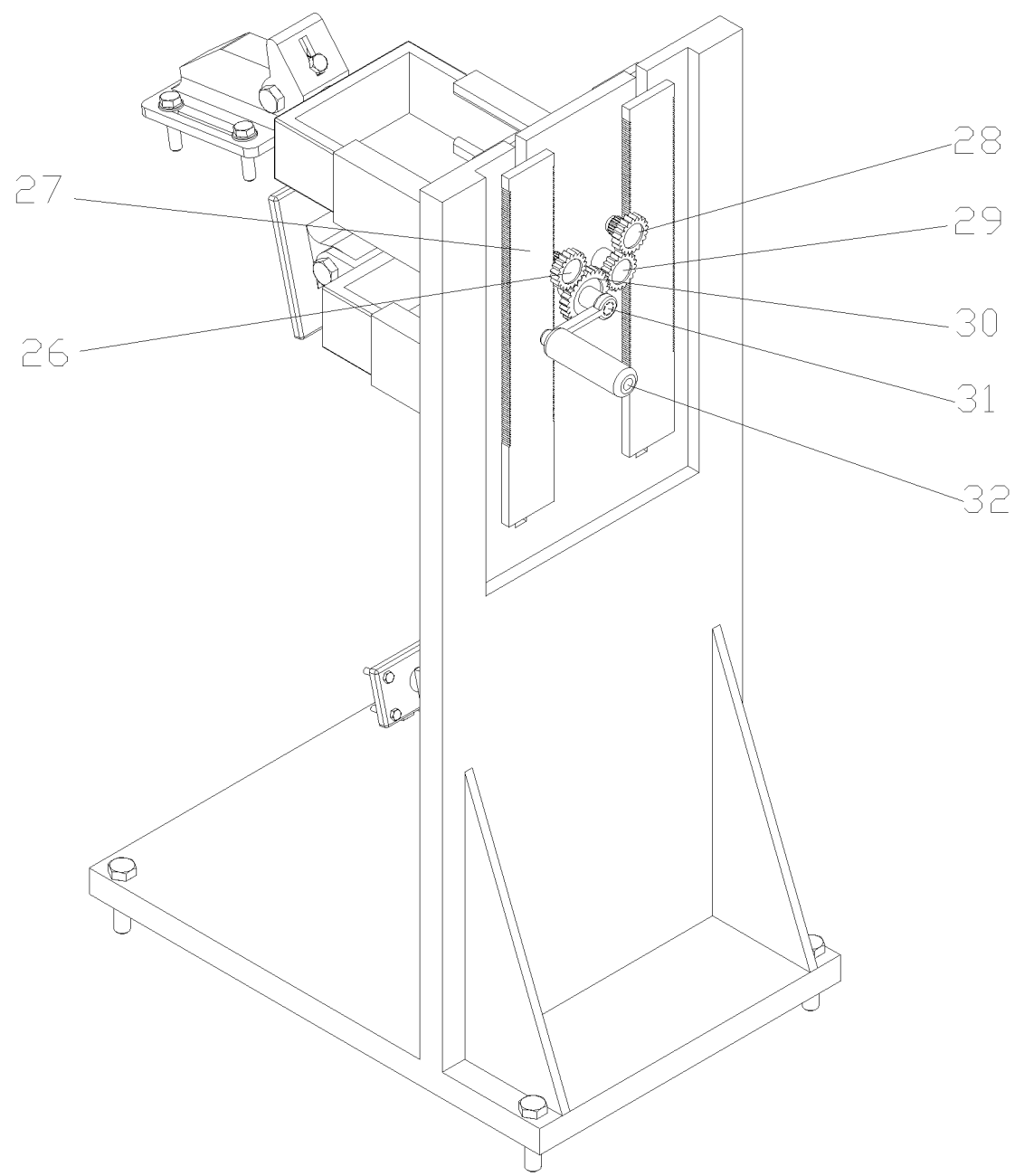
FIG. 5 is a schematic structural diagram of another dummy fixing apparatus for a vehicle crash test according to an embodiment of the present disclosure.
Figure 6:
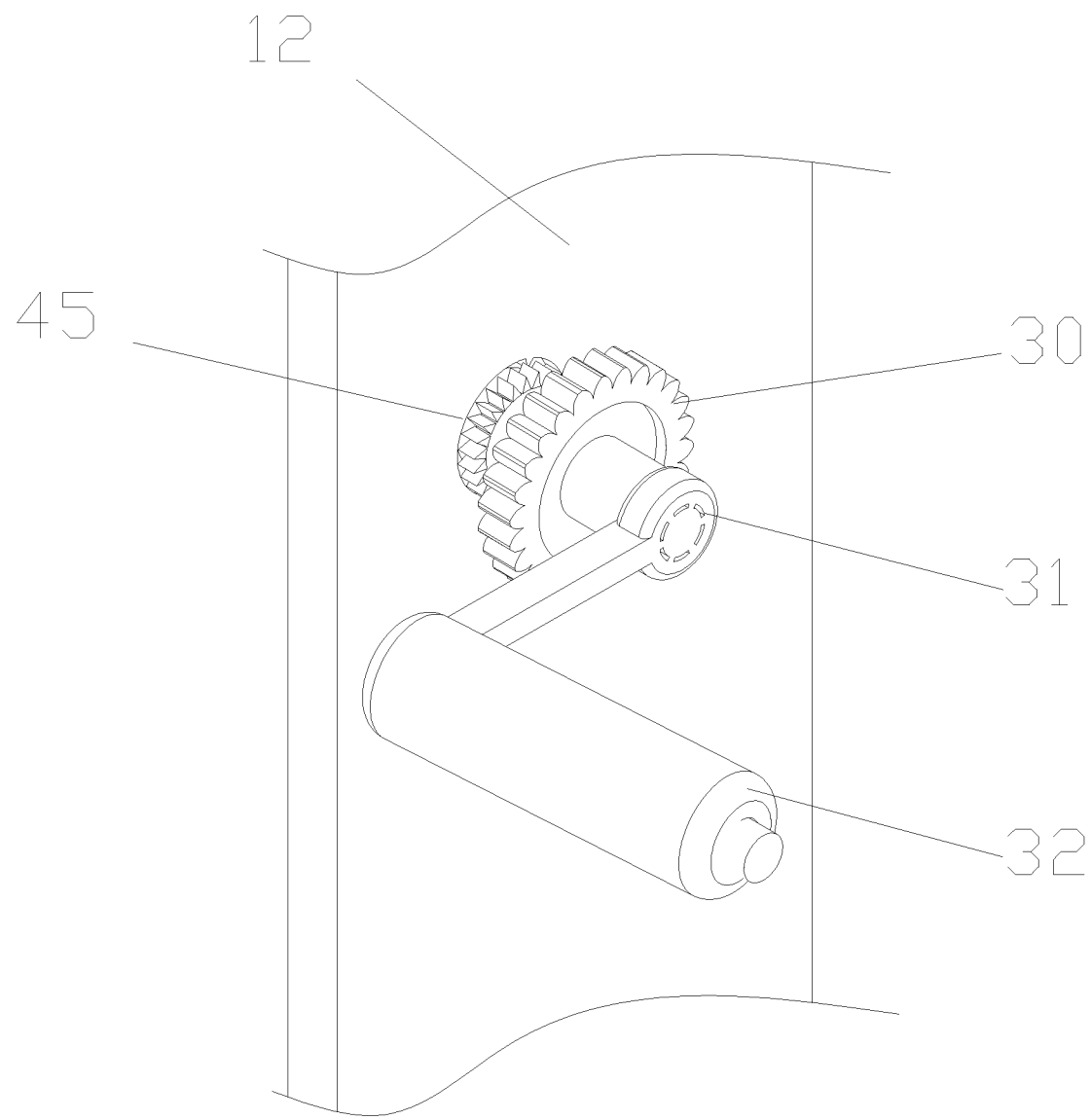
FIG. 6 is a schematic structural diagram of cooperation between a crank and a clamping groove according to an embodiment of the present disclosure.
Figure 7:
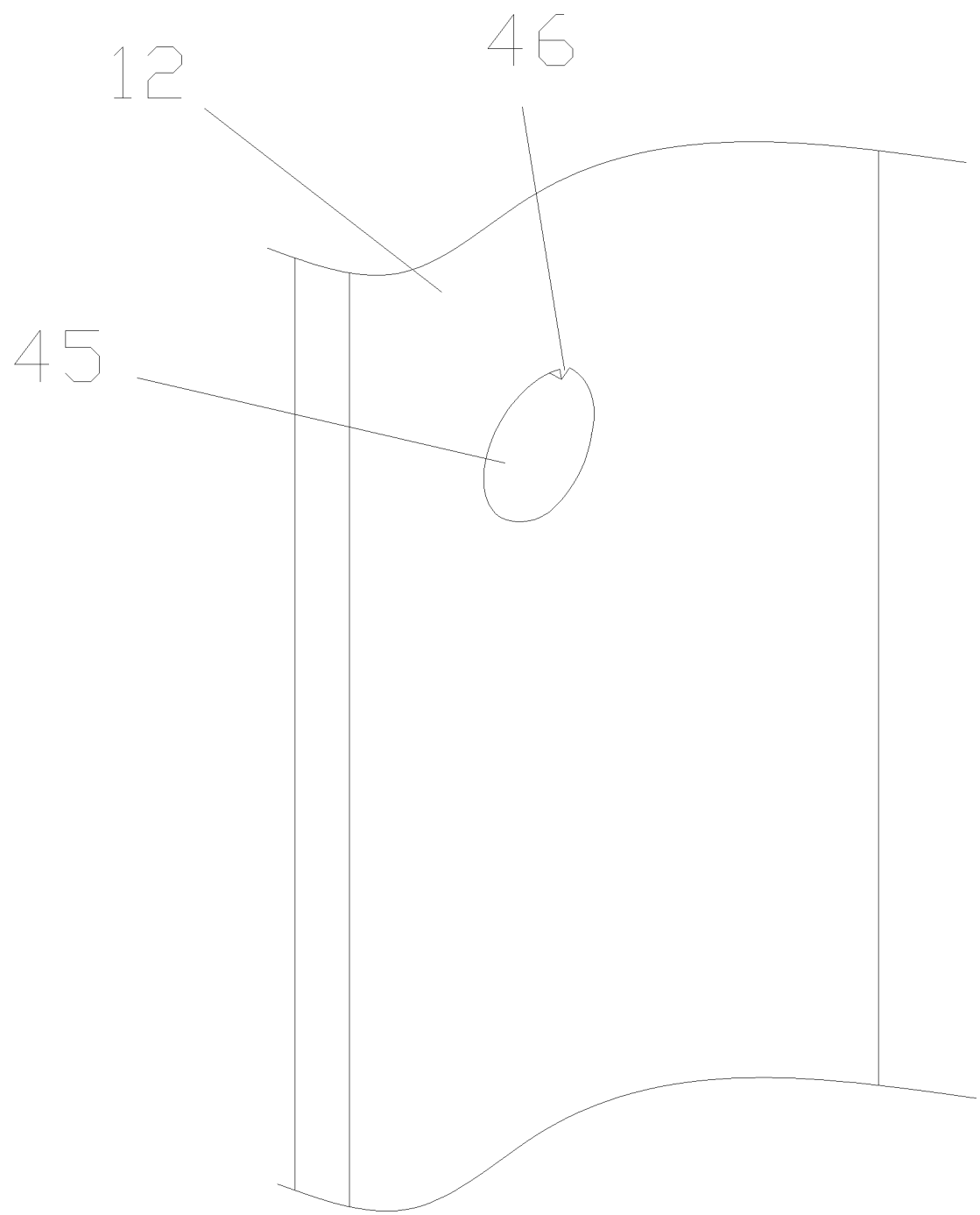
FIG. 7 is a schematic structural diagram of a clamping groove on a trunk support plate according to an embodiment of the present disclosure.
Figure 8:
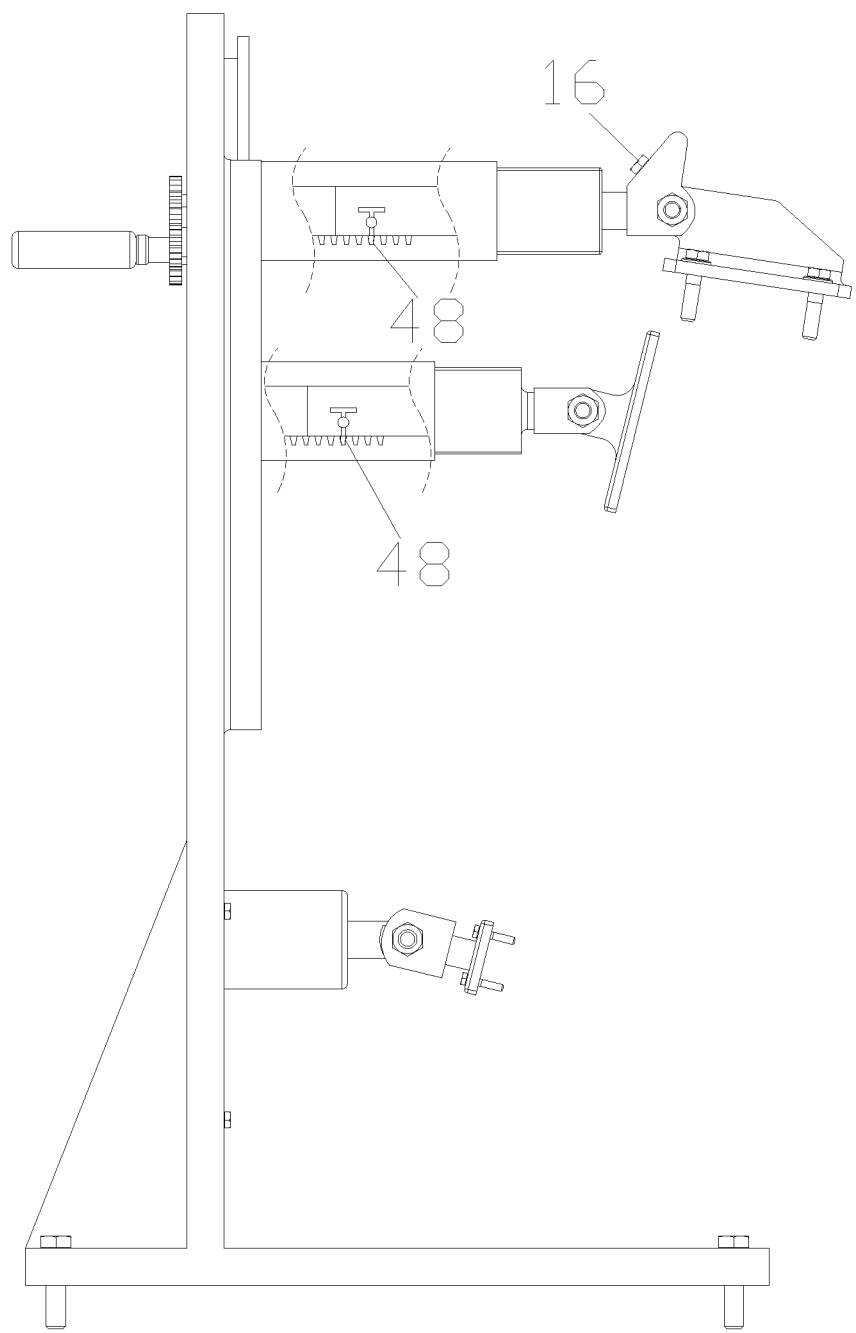
FIG. 8 is a schematic structural diagram of a limit clamping groove on a second slide rail and a third slide rail according to an embodiment of the present disclosure.
Figure 9:
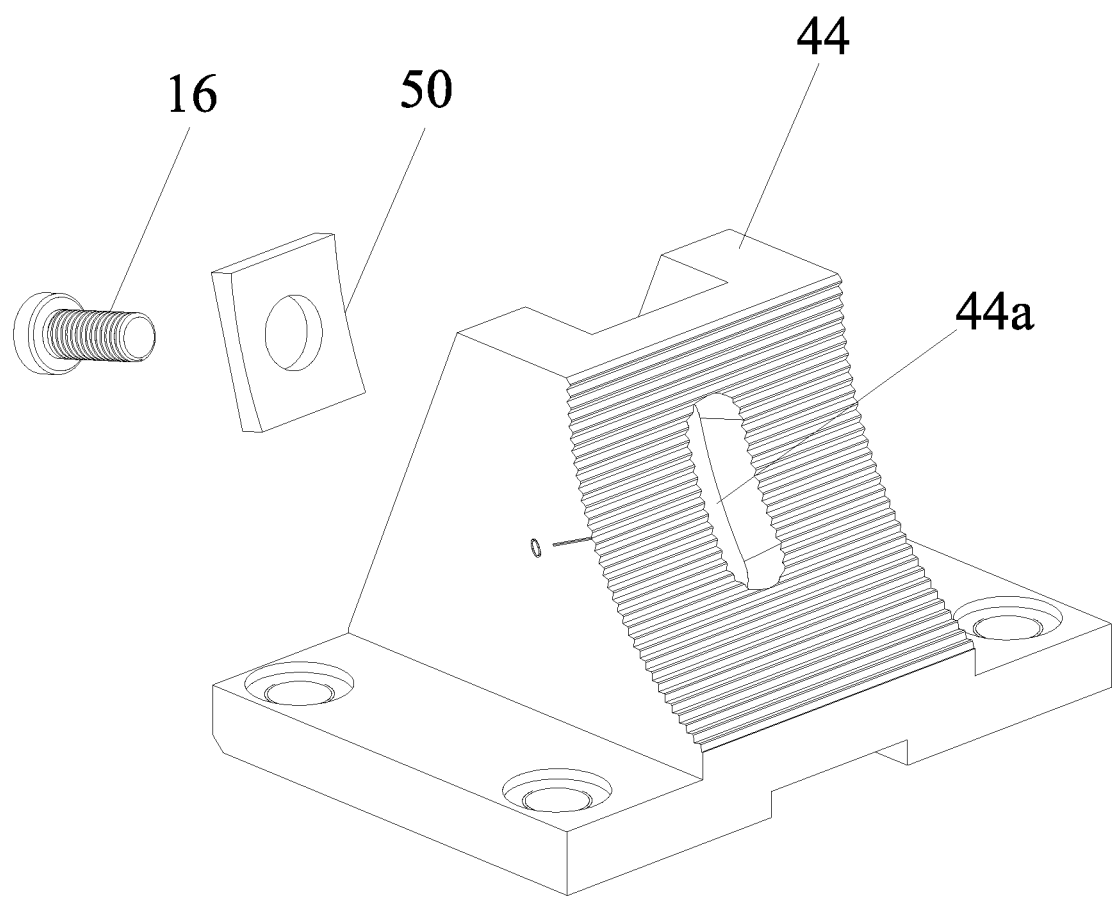
FIG. 9 is a schematic structural diagram of cooperation between a second adjusting bolt and a limit slider according to an embodiment of the present disclosure.
Figure 10:
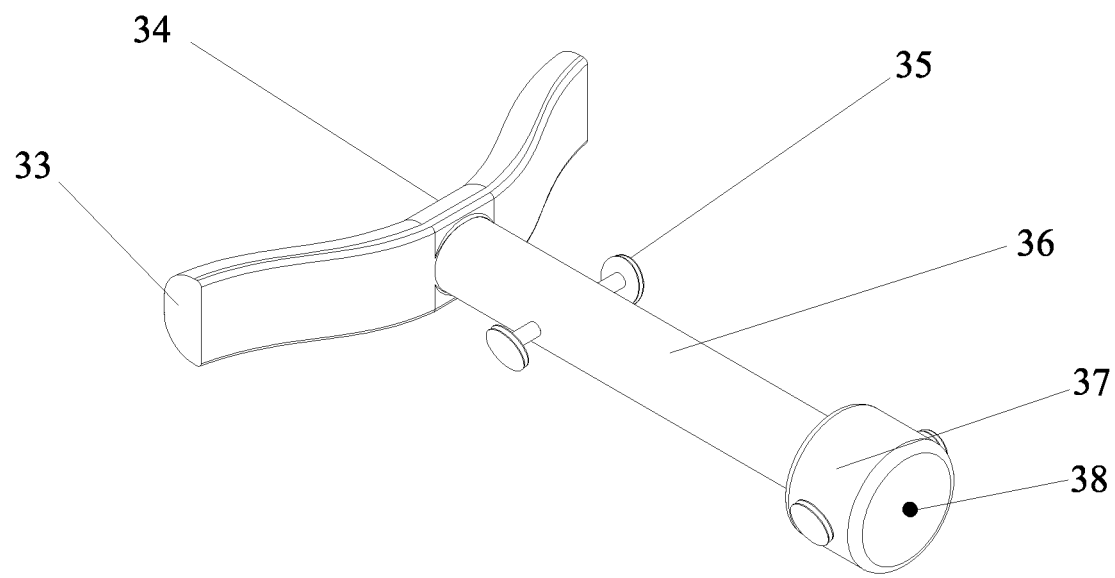
FIG. 10 is a schematic structural diagram of an impact hammer according to an embodiment of the present disclosure.
Figure 11:
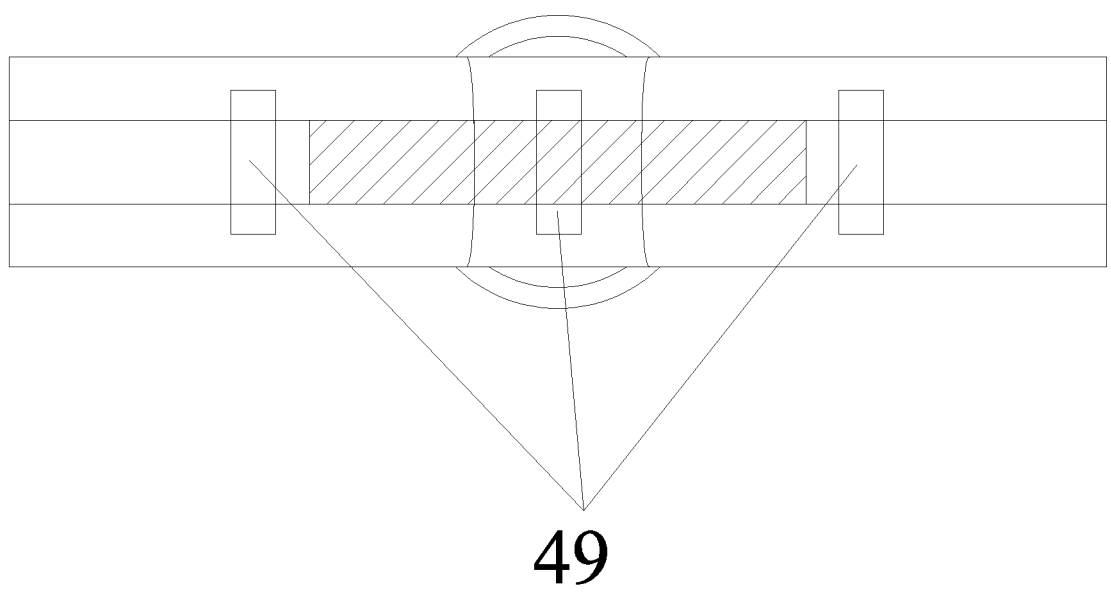
FIG. 11 is a schematic diagram of a contact surface between an arc-shaped hammer head and a lower abdomen of a dummy according to an embodiment of the present disclosure.
Figure 12:
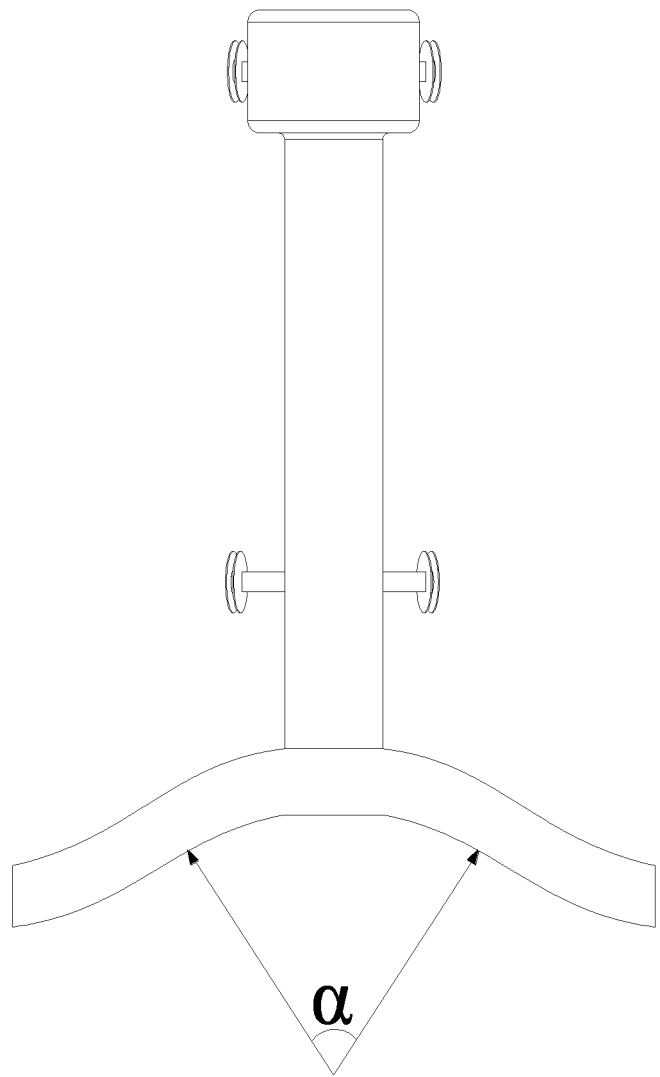
FIG. 12 is a top view of an arc-shaped hammer head according to an embodiment of the present disclosure.

FIG. 2 is a schematic structural diagram of a device for impact test on a lower abdomen of a vehicle crash test dummy according to an embodiment of the present disclosure. FIG. 3 is a schematic diagram of cooperation between a dummy fixing apparatus for a vehicle crash test and a preset dummy according to an embodiment of the present disclosure. FIG. 4 is a schematic structural diagram of a dummy fixing apparatus for a vehicle crash test according to an embodiment of the present disclosure. FIG. 5 is a schematic structural diagram of another dummy fixing apparatus for a vehicle crash test according to an embodiment of the present disclosure. FIG. 6 is a schematic structural diagram of cooperation between a crank and a clamping groove according to an embodiment of the present disclosure. FIG. 7 is a schematic structural diagram of a clamping groove on a trunk support plate according to an embodiment of the present disclosure. FIG. 8 is a schematic structural diagram of a limit clamping groove on a second slide rail and a third slide rail according to an embodiment of the present disclosure. FIG. 9 is a schematic structural diagram of cooperation between a second adjusting bolt and a limit slider according to an embodiment of the present disclosure. FIG. 10 is a schematic structural diagram of an impact hammer according to an embodiment of the present disclosure. FIG. 11 is a schematic diagram of a contact surface between an arc-shaped hammer head and a lower abdomen of a dummy according to an embodiment of the present disclosure. FIG. 12 is a top view of an arc-shaped hammer head according to an embodiment of the present disclosure. The device for impact test on a lower abdomen of a vehicle crash test dummy is used for implementing the method for impact test on a lower abdomen of a vehicle crash test dummy described in the foregoing embodiments. As shown in FIGS. 2-12, the device for impact test on a lower abdomen of a vehicle crash test dummy includes a fixing platform 1, a dummy fixing apparatus 2, an impact hammer 3, a control apparatus 39 connected to the impact hammer 3, and a preset dummy 43. The dummy fixing apparatus 2 is provided with a pressure sensor 7. The pressure sensor 7 is connected to a pelvic tail of the preset dummy and the control apparatus respectively. The impact hammer 3 comprises an arc-shaped hammer head 33 and a displacement sensor 34. The displacement sensor 34 is connected to the arc-shaped hammer head 33 and the control apparatus respectively.

The fixing platform 1 is used for fixing the dummy fixing apparatus 2. The dummy fixing apparatus 2 is used for fixing the preset dummy. The impact hammer 3 is used for driving the arc-shaped hammer head 33 to impact the lower abdomen of the preset dummy. The control apparatus is used for controlling the impact hammer 3 to impact the lower abdomen of the preset dummy. Specifically, the control apparatus can drive the impact hammer 3 to impact the lower abdomen of the preset dummy by controlling a mechanical apparatus (not shown in the figures), where the mechanical apparatus may be a bracket connected to the impact hammer 3. The pressure sensor 7 is used for collecting pressure borne by the lower abdomen of the preset dummy when the arc-shaped hammer head 33 impacts the lower abdomen of the preset dummy. The displacement sensor 34 is used for collecting the displacements generated by the lower abdomen of the preset dummy and the arc-shaped hammer head 33 when the arc-shaped hammer head 33 impacts the lower abdomen of the preset dummy. The control apparatus is further used for determining, based on the displacements and the pressure, whether the preset dummy satisfies the biological simulation standard.

Before the impact test on the lower abdomen of the dummy in the embodiment, the appearance of the abdomen and pelvis of the preset dummy may be inspected to determine whether there is any rupture in the abdomen and pelvis of the preset dummy. Subsequently, a dummy test portion may be placed in an environment at a temperature in a range of 20.6° C. to 22.2° C. and with a relative humidity in a range of 10% to 70% for at least 4 hours. At the beginning of the test, the abdomen and pelvis of the preset dummy and an impact surface of the arc-shaped hammer head may be cleaned with alcohol.

The hammer head portion of the impact hammer 3 is designed as the arc-shaped hammer head 33 according to impact of a safety belt on a human abdomen. The lower abdomen impact test is developed according to the injury of the human abdomen, which is mainly caused by the impact of the safety belt on the chest and abdomen of the human body that inclines forward due to inertia when the driver brakes suddenly during high-speed driving. This test is mainly used for studying the consistency between the injury of the human abdomen and the mechanical response of the dummy abdomen. When a contact area between the safety belt and the human body is large and acceleration is high, a force loading mode of the safety belt on the human body is similar to blunt impact, including the same energy propagation mode and impact speed. However, the crash position, the shape of an impact object, and the posture of the human body in the crash process all affect the structure. Therefore, the arc-shaped hammer head is used for simulating the impact of the safety belt on the lower abdomen of the human body, so that the mechanical response of the dummy can be closer to the mechanical response of the real human body.

A width and a contact surface angle α of the arc-shaped hammer head 33 (as shown in FIG. 12) are determined according to mass test data. Preferably, the width of the arc-shaped hammer head 33 may range from 40 mm to 50 mm, and the contact surface angle α may range from 1000 to 130°. After the arc-shaped hammer head 33 impacts the lower abdomen of the preset dummy, the contact surface between the arc-shaped hammer head 33 and the lower abdomen of the preset dummy is shown in FIG. 6.

The embodiment has the following technical effects: the arc-shaped hammer head impacts the lower abdomen of the preset dummy at the preset speed so as to simulate a scenario where a driver brakes suddenly during high-speed driving, the human body inclines forward due to inertia, and the safety belt impacts the lower abdomen of the human body; the dummy is fixed at a test position by using the fixing platform and the dummy fixing apparatus so as to ensure that the dummy does not move in the impact test process, the displacement sensor and the pressure sensor detect the displacements of the lower abdomen of the dummy and the arc-shaped hammer head and the pressure borne by the lower abdomen of the dummy when the arc-shaped hammer head impacts the lower abdomen of the dummy, and whether the mechanical responses of the dummy satisfy the biological simulation standard is determined by using the displacements and the pressure; and therefore, the shortcoming that existing dummy calibration tests focus on only the head, neck, chest, knees and other parts but not on the lower abdomen is overcome, and the lower abdomen impact test is capable of testing whether the current dummy satisfies the biological simulation standard so as to ensure the accuracy of test data in subsequent vehicle crash tests using the dummy. Meanwhile, the impact hammer having the arc-shaped hammer head can restore a real status of human abdominal injuries as much as possible. Injuries of the human body are different due to different impact positions, so bio-mechanical responses of the dummy after impact are also different. Moreover, a dummy model may be optimized subsequently through the test results so as to improve biological simulation of a car crash dummy.

Based on the foregoing embodiments, the dummy fixing apparatus 2 further includes a trunk support plate 12, a chest connecting portion 40, a back support portion 41, and a pelvic tail connecting portion 43. The chest connecting portion 40 includes a second adjusting bolt 16, a cover plate 17, a chest connecting plate 18, a third compression bolt 19, and an adjusting hole 20. The back support portion 41 includes a back support plate 21 and a first adjusting bolt 8. The pelvic tail connecting portion 43 includes a third adjusting bolt 22, a fourth compression bolt 23, and a pelvic tail connecting plate 24.

The chest connecting portion 40 is connected to the trunk support plate 12. A limit slider 44 is arranged inside the cover plate 17. The second adjusting bolt 16 cooperates with the limit slider 44 so as to adjust an angle of the chest connecting plate 18, so that a chest angle of the preset dummy is adjusted. Specifically, as shown in FIG. 4 and FIG. 9, the second adjusting bolt 16 passes through a gasket 50 and an elongated hole 44a in the limit slider 44 to be connected to the chest connecting plate 18, and two sides of the chest connecting plate 18 are rotatably connected to the cover plate 17. After loosening a nut of the second adjusting bolt 16, the second adjusting bolt 16 may move in the elongated hole 44a of the limit slider 44. And the nut is tightened after moving to a suitable position, so that the angle of the chest connection plate 18 is adjusted.

The chest connecting plate 18 is used for supporting the chest of the preset dummy. The third compression bolt 19 is used for fixing and connecting the chest of the preset dummy. The adjusting hole 20 is used for adjusting a position of the third compression bolt 19 according to different percentiles of the preset dummy.

The back support portion 41 is connected to the trunk support plate 12. The first adjusting bolt 8 is used for adjusting an angle of the back support plate 21 so as to match a trunk angle of the preset dummy. The back support plate 21 is used for supporting a back of the preset dummy;

The pelvic tail connecting portion 42 is connected to the trunk support plate 12 through the pressure sensor 7. The pelvic tail connecting plate 24 is used for supporting the pelvic tail of the preset dummy. The third adjusting bolt 22 is used for adjusting an angle of the pelvic tail connecting plate 24 so as to adjust an angle of the pelvic tail of the preset dummy. The fourth compression bolt 23 is used for fixing and connecting the pelvic tail of the preset dummy.

In the embodiment, the second adjusting bolt 16 cooperates with the limit slider 44 so as to adjust the angle of the chest connecting plate 18, within an angle variation range of 0.5° to 1°. The first adjusting bolt 8 adjusts the angle of the back support plate 21, within an angle variation range of 0.5° to 1°. The third adjusting bolt 22 adjusts the angle of the pelvic tail connecting plate 24, within an angle variation range of 0.5° to 1°. The third compression bolt 19 and the fourth compression bolt 23 are used with gaskets during actual use.

Based on the foregoing embodiments, the dummy fixing apparatus 2 further includes a hand grip 32, a crank 31, a first-stage single-layer gear 30, a second-stage single-layer gear 29, a second-stage double-layer gear 26, a third-stage double-layer gear 28, a fourth slider 27, a first slide rail 11, a first slider 13, a second slide rail 14, a second slider 15, a third slide rail 10, and a third slider 9.

The fourth slider 27 is connected to the first slider 13. When a position of the first slider 13 needs to be adjusted, the crank 31 is pulled out of a clamping groove, and the hand grip 32 is driven by an external force to rotate and drive the first-stage single-layer gear 30, the second-stage single-layer gear 29, the second-stage double-layer gear 26, and the third-stage double-layer gear 28 to rotate, so that the fourth slider 27 drives the first slider 13 to move up and down. When the first slider 13 arrives at a target position, the crank 31 is inserted into the clamping groove to prevent the hand grip 32 from rotating.

Specifically, as shown in FIG. 5, FIG. 6 and FIG. 7, a clamping groove 45 is arranged on the trunk support plate 12, one end of the crank 31 is connected to the hand grip 32, and the other end is connected to a limit gear 47. The crank 31 is arranged through the first-stage single-layer gear 30 and is fixedly connected to the first-stage single-layer gear 30. A limit tooth 46 is arranged on an inner wall of the clamping groove 45. When the crank 31 is inserted into the clamping groove 45, that is, the limit gear 47 is inserted into the clamping groove 45, the limit gear 47 meshes with the limit tooth 46, and the hand grip 32 cannot drive the crank 31 to rotate. When the crank 31 is pulled out of the clamping groove 45, that is, the limit gear 47 is pulled out of the clamping groove 45, the limit effect of the limit tooth 46 on the limit gear 47 is lost, the hand grip 32 can drive the crank 31 to rotate, and the first-stage single-layer gear 30 on the crank 31 rotates thereupon.

The first slide rail 11 is arranged on the trunk support plate 12. The second slide rail 14 and the third slide rail 10 are arranged on the first slider 13 respectively. The first slider 13 moves up and down along the first slide rail 11 under the drive of the fourth slider 27, and drives the second slide rail 14 and the third slide rail 10 to move up and down.

The chest connecting portion is arranged on the second slider 15. The second slider 15 moves forward and backward along the second slide rail 14, and drives the chest connecting portion to move forward and backward, so as to assist in adjusting the trunk angle of the preset dummy. The second slider 15 is positioned through a limit clamping groove on the second slide rail 14.

The back support portion is arranged on the third slider 9. The third slider 9 moves forward and backward along the third slide rail 10, and drives the back support portion to move forward and backward, so as to assist in adjusting the trunk angle of the preset dummy. The third slider 9 is positioned through a limit clamping groove on the third slide rail 10.

In the embodiment, the fourth slider 27 drives the first slider 13 to move up and down within a range of 2 mm to 4 mm. The second slider 15 drives the chest connecting portion to move forward and backward within a range of 5 mm to 10 mm. The third slider 9 drives the back support portion to move forward and backward within a range of 5 mm to 10 mm.

The dummy lower abdomen impact test device in the embodiment is applicable to a variety of percentile dummies, and is applicable to a variety of working conditions due to its adjustable angle and height. In order to facilitate fixation of the dummy, a trunk of the dummy used for testing includes a chest (including a spine box, ribs, and chest skin), a lumbar spine, an abdomen, and a pelvis. First, an overall placement angle of the dummy trunk is determined. The angle between the chest of the preset dummy and a vertical plane is set to be 27±1° according to test data. The chest of the preset dummy may be adjusted to a desired angle by adjusting the second adjusting bolt 16 and the limit slider. The angle between the pelvic tail of the preset dummy and the vertical plane is set to be 63±1°. The angle of the pelvic tail connecting plate may be adjusted to a desired angle by adjusting the third adjusting bolt 22. The height of the first slider 13 may be adjusted by using the hand grip 32, so as to adjust the chest of the preset dummy to a preset height. The spine box and the pelvis of the preset dummy may be maintained on a straight line by adjusting the positions of the second slider 15 and the third slider 9. Then the second slider 15 and the third slider 9 are fixed through the limit clamping grooves on the second slide rail 14 and the third slide rail 10 respectively. The angle of the back support plate 21 may be further adjusted to a desired support angle for the trunk of the preset dummy by adjusting the first adjusting bolt 8, so that the back support plate 21 can support the back of the trunk of the preset dummy.

Based on the foregoing embodiments, the dummy fixing apparatus 2 further includes a first compression bolt 4, a support rib plate 5, a second compression bolt 6, and a trunk support bottom plate 25.

The trunk support bottom plate 25 is fixed on the fixing platform 1 through the first compression bolt 4 so as to support the trunk support plate 12.

The support rib plate 5 is fixedly arranged between the trunk support bottom plate 25 and the trunk support plate 12 through the second compression bolt 6 so as to assist the trunk support bottom plate 25 in supporting the trunk support plate 12.

In the embodiment, the first compression bolt 4 and the second compression bolt 6 are used with gaskets during actual use.

Based on the foregoing embodiments, the impact hammer 3 further includes a hammer body 36. The arc-shaped hammer head 33 is arranged at one end of the hammer body

36. An acceleration sensor 38 is arranged at an end, away from the arc-shaped hammer head 33, of the hammer body 36. The acceleration sensor 38 is arranged on a central axis of the hammer body 36. A sensitive axis direction of the acceleration sensor points to an impact direction. The acceleration sensor 38 is connected to the control apparatus.

The acceleration sensor 38 is used for feeding back a real-time acceleration of the arc-shaped hammer head 33.

The control apparatus is further used for adjusting the pendulum force of the arc-shaped hammer head 33 according to the real-time acceleration fed back by the acceleration sensor 38.

The acceleration sensor 38 in the embodiment may preferably be a single-axis acceleration sensor.

In the embodiment, the impact hammer 3 may further include a pulley 35 and an impact hammer counterweight 37. The pulley 35 is used for mounting the impact hammer counterweight 37. The impact hammer counterweight 37 is used for enabling a total weight of the impact hammer 3 so as to satisfy preset requirements.

The hammer body 36 is a rigid cylinder having a diameter of 150±1 mm, a fillet radius of 12.7±0.3 mm, and a weight (including the impact hammer counterweight 37, the pulley 35, the displacement sensor 34, and the acceleration sensor 38) of 20±1 kg. The central position of the arc-shaped hammer head 33 is flush with the central position of the abdomen of the dummy. The impact hammer 3 is parallel to the fixing platform 1, so that the center line of the arc-shaped hammer head 33 is in the same horizontal plane as the pressure sensor at the pelvic tail.

Based on the foregoing embodiments, a metal sheet 49 is arranged at a preset position on the arc-shaped hammer head 33. The arc-shaped hammer head 33 is connected to the displacement sensor 34 through the metal sheet 49.

It should be noted that the terms used in the present disclosure are only used for describing specific embodiments, rather than limiting the scope of the present application. As shown in the description and claims of the present disclosure, unless the context clearly dictates otherwise, the words "a", "one", "an", and/or "the" are not intended to specifically refer to the singular and can include the plural. The terms "include", "comprise", or any variants thereof are intended to cover a non-exclusive inclusion, so that a process, method, or device that includes a series of elements not only includes these elements, but also includes other elements not listed explicitly, or includes inherent elements of the process, method, or device. In the absence of more limitations, an element defined by "include a . . . " does not exclude other same elements existing in the process, method, or device including the element.

It should also be noted that the orientation or position relationships indicated by the terms "center", "upper", "lower", "left", "right", "vertical", "horizontal", "inner", "outer", etc. are based on the orientation or position relationships shown in the accompanying drawings and are intended to facilitate the description of the present disclosure and simplify the description only, rather than indicating or implying that the device or element referred to must have a particular orientation or be constructed and operated in a particular orientation, and cannot be interpreted as limiting the present disclosure. Unless otherwise specified and defined, the terms "mounted", "coupled" and "connected" should be generally understood, for example, the "connected" may be fixedly connected, detachably connected, integrally connected, mechanically connected, electrically connected, directly connected, or connected by a medium, or internal communication between two elements. For those of ordinary skill in the art, the specific meanings of the terms described above in the present disclosure can be construed according to specific circumstances.

Finally, it should be noted that the above embodiments are merely used to describe the technical solutions of the present disclosure, instead of limiting the same. Although the present disclosure has been described in detail with reference to all the foregoing embodiments, those of ordinary skill in the art should understand that the technical solutions described in all the foregoing embodiments can still be modified, and alternatively, some or all the technical features therein can be equivalently replaced. However, these modifications or substitutions do not make the essence of the corresponding technical solutions deviate from the technical solutions of all the embodiments of the present disclosure.

What is claimed is:

1. A device for impact test on a lower abdomen of a vehicle crash test dummy, comprising a fixing platform (1), a dummy fixing apparatus (2), an impact hammer (3), a control apparatus (39) connected to the impact hammer (3), and a preset dummy (43), wherein the dummy fixing apparatus (2) is provided with a pressure sensor (7), the pressure sensor (7) is connected to a pelvic tail of the preset dummy (43) and the control apparatus (39) respectively, the impact hammer (3) comprises an arc-shaped hammer head (33) and a displacement sensor (34), and the displacement sensor (34) is connected to the arc-shaped hammer head (33) and the control apparatus (39) respectively;

the fixing platform (1) is used for fixing the dummy fixing apparatus (2);

the dummy fixing apparatus (2) is used for fixing the preset dummy (43);

the impact hammer (3) is used for driving the arc-shaped hammer head (33) to impact a lower abdomen of the preset dummy (43);

the control apparatus is used for controlling the impact hammer (3) to impact the lower abdomen of the preset dummy;

the pressure sensor (7) is used for collecting a pressure borne by the lower abdomen of the preset dummy (43) when the arc-shaped hammer head (33) impacts the lower abdomen of the preset dummy (43);

the displacement sensor (34) is used for collecting displacements generated by the lower abdomen of the preset dummy (43) and the arc-shaped hammer head (33) when the arc-shaped hammer head (33) impacts the lower abdomen of the preset dummy (43);

the control apparatus (39) is further used for determining, based on the displacements and the pressure, whether the preset dummy satisfies a biological simulation standard;

the dummy fixing apparatus (2) further comprises a trunk support plate (12), a chest connecting portion (40), a back support portion (41), and a pelvic tail connecting portion (42); the chest connecting portion (40) comprises a second adjusting bolt (16), a cover plate (17), a chest connecting plate (18), a third compression bolt (19), and an adjusting hole (20); the back support portion (41) comprises a back support plate (21) and a first adjusting bolt (8); the pelvic tail connecting portion (42) comprises a third adjusting bolt (22), a fourth compression bolt (23), and a pelvic tail connecting plate (24);

the chest connecting portion (40) is connected to the trunk support plate (12), a limit slider (44) is arranged inside the cover plate (17), and the second adjusting bolt (16) cooperates with the limit slider (44) so as to adjust an angle of the chest connecting plate (18), so that a chest angle of the preset dummy (43) is adjusted; the chest connecting plate (18) is used for supporting a chest of the preset dummy (43), the third compression bolt (19) is used for fixing and connecting the chest of the preset dummy (43), and the adjusting hole (20) is used for adjusting a position of the third compression bolt (19) according to different percentiles of the preset dummy (43);

the back support portion is connected to the trunk support plate (12), the first adjusting bolt (8) is used for adjusting an angle of the back support plate (21) so as to match a trunk angle of the preset dummy (43), and the back support plate (21) is used for supporting a back of the preset dummy (43); and the pelvic tail connecting portion is connected to the trunk support plate (12) through the pressure sensor (7), the pelvic tail connecting plate (24) is used for supporting the pelvic tail of the preset dummy (43), the third adjusting bolt (22) is used for adjusting an angle of the pelvic tail connecting plate (24) so as to adjust an angle of the pelvic tail of the preset dummy (43), and the fourth compression bolt (23) is used for fixing and connecting the pelvic tail of the preset dummy (43).

2. The device according to claim 1, wherein the dummy fixing apparatus (2) further comprises a hand grip (32), a crank (31), a first-stage single-layer gear (30), a second-stage single-layer gear (29), a second-stage double-layer gear (26), a third-stage double-layer gear (28), a fourth slider (27), a first slide rail (11), a first slider (13), a second slide rail (14), a second slider (15), a third slide rail (10), and a third slider (9);

the fourth slider (27) is connected to the first slider (13); when a position of the first slider (13) needs to be adjusted, the crank (31) is pulled out of a clamping groove (45), and the hand grip (32) is driven by an external force to rotate and drive the first-stage single-layer gear (30), the second-stage single-layer gear (29), the second-stage double-layer gear (26) and the third-stage double-layer gear (28) to rotate, so that the fourth slider (27) drives the first slider (13) to move up and down; and when the first slider (13) arrives at a target position, the crank (31) is inserted into the clamping groove (45) to prevent the hand grip (32) from rotating;

the first slide rail (11) is arranged on the trunk support plate (12), the second slide rail (14) and the third slide rail (10) are arranged on the first slider (13) respectively, and the first slider (13) moves up and down along the first slide rail (11) under the drive of the fourth slider (27), and drives the second slide rail (14) and the third slide rail (10) to move up and down;

the chest connecting portion (40) is arranged on the second slider (15), and the second slider (15) moves forward and backward along the second slide rail (14), and drives the chest connecting portion (40) to move forward and backward, so as to assist in adjusting the trunk angle of the preset dummy (43); the second slider (15) is positioned through a limit clamping groove (48) on the second slide rail (14); and the back support portion (41) is arranged on the third slider (9), and the third slider (9) moves forward and backward along the third slide rail (10), and drives the back support portion to move forward and backward, so as to assist in adjusting the trunk angle of the preset dummy; and the third slider (9) is positioned through a limit clamping groove (48) on the third slide rail (10).

3. The device according to claim 2, wherein the dummy fixing apparatus (2) further comprises a first compression bolt (4), a support rib plate (5), a second compression bolt (6), and a trunk support bottom plate (25);

the trunk support bottom plate (25) is fixed on the fixing platform (1) through the first compression bolt (4) so as to support the trunk support plate (12); and the support rib plate (5) is fixedly arranged between the trunk support bottom plate (25) and the trunk support plate (12) through the second compression bolt (6) to assist the trunk support bottom plate (25) in supporting the trunk support plate (12).

4. The device according to claim 1, wherein the impact hammer (3) further comprises a hammer body (36), the arc-shaped hammer head (33) is arranged at one end of the hammer body (36), an acceleration sensor (38) is arranged at an end, away from the arc-shaped hammer head (33), of the hammer body (36), the acceleration sensor (38) is arranged on a central axis of the hammer body (36), a sensitive axis direction of the acceleration sensor points to an impact direction, and the acceleration sensor (38) is connected to the control apparatus (39);

the acceleration sensor (38) is used for feeding back a real-time acceleration of the arc-shaped hammer head (33); and the control apparatus (39) is further used for adjusting a pendulum force of the arc-shaped hammer head (33) according to the real-time acceleration fed back by the acceleration sensor (38).

5. The device according to claim 4, wherein a metal sheet (49) is arranged at a preset position on the arc-shaped hammer head (33), and the arc-shaped hammer head (33) is connected to the displacement sensor (34) through the metal sheet (49).

6. A method for impact test on a lower abdomen of a vehicle crash test dummy, wherein the method is performed by the device according to claim 1, and the method comprises:

controlling the arc-shaped hammer head to impact the lower abdomen of the preset dummy at a preset speed;

obtaining the displacements from the displacement sensor, wherein the displacements are generated by the lower abdomen of the preset dummy and the arc-shaped hammer head during the impact;

obtaining the pressure from the pressure sensor, wherein the pressure is borne by the lower abdomen of the preset dummy during the impact; and determining, based on the displacements and the pressure, whether the preset dummy satisfies the biological simulation standard.

7. The method according to claim 6, further comprising:
adjusting a pendulum force of the arc-shaped hammer head according to a real-time acceleration fed back by an acceleration sensor.

8. The method according to claim 6, wherein the determining, based on the displacements and the pressure, whether the preset dummy satisfies the biological simulation standard comprises:

determining a displacement-time test curve based on the displacements;

determining a pressure-time test curve based on the pressure;

determining, based on a corridor method, a first similarity between the displacement-time test curve and a displacement-time standard curve, wherein the displacement-time standard curve is obtained from a lower abdomen impact test on a standard dummy;

determining, based on the corridor method, a second similarity between the pressure-time test curve and a pressure-time standard curve, wherein the pressure-time standard curve is obtained from the lower abdomen impact test on standard dummy; and determining, based on the first similarity and the second similarity, whether the preset dummy satisfies the biological simulation standard.

9. The method according to claim 6, wherein the displacements comprise a displacement corresponding to a preset position, wherein the preset position is a central position of each portion after a contact surface between the arc-shaped hammer head and the lower abdomen is evenly divided into at least two portions.

* * * * *